United States Patent
Kashiki

[15] 3,705,770
[45] Dec. 12, 1972

[54] ATOMIC ABSORPTION SPECTROSCOPIC ANALYTICAL METHOD AND APPARATUS

[72] Inventor: Masayuki Kashiki, Souka, Japan
[73] Assignee: Maruzen Oil Company Limited, Osaka, Japan
[22] Filed: Nov. 9, 1970
[21] Appl. No.: 87,662

[30] Foreign Application Priority Data

Nov. 8, 1969 Japan ................................. 44/89599

[52] U.S. Cl. ..................... 356/36, 356/87, 356/246
[51] Int. Cl. ............................ G01n 1/00, G01n 1/10
[58] Field of Search .....356/36, 70, 87, 187, 208, 246

[56] References Cited

UNITED STATES PATENTS

| | | | |
|---|---|---|---|
| 2,992,077 | 7/1961 | Schneider, Jr. et al. | ...........356/246 X |
| 3,430,864 | 3/1969 | Miller et al. | .........................356/87 X |
| 3,467,471 | 9/1969 | Greenfield et al. | ....................356/36 |

OTHER PUBLICATIONS

Woods "Flame Spectroscopy of Powders" Applied Spectroscopy V. 22, No. 6, 1968, pp. 799–800.
Gilbert, Jr. "Direct Flame–hotometric Analysis of Powdered Materials" Analyt. Chem., V. 34, No. 8, July, 1962. pp. 1025–1026.
Rudiger et al., Analyst V. 94, Mar., 1969, pp. 204–208.
Allan, Spectrochimica ACTA, V. 17, 1961, pp. 467–473.

Primary Examiner—Ronald L. Wibert
Assistant Examiner—V. P. McGraw
Attorney—Sughrue, Rothwell, Mion, Zinn & Macpeak

[57] ABSTRACT

In the atomic absorption spectroscopic analysis of a solid or a sludge-like or a paste-like sample, the sample is fed in a uniformly dispersed and mixed state with a liquid to a flame via an atomizer in an atomic absorption spectroscopic analytical apparatus. Furthermore, there is provided an apparatus suitable for practising this method, which comprises a sample vessel and a stirring means for dispersing and uniformly mixing a solid and liquid and a capillary of which the lower end is inserted in said vessel and the upper end is connected with an atomizer.

6 Claims, 1 Drawing Figure

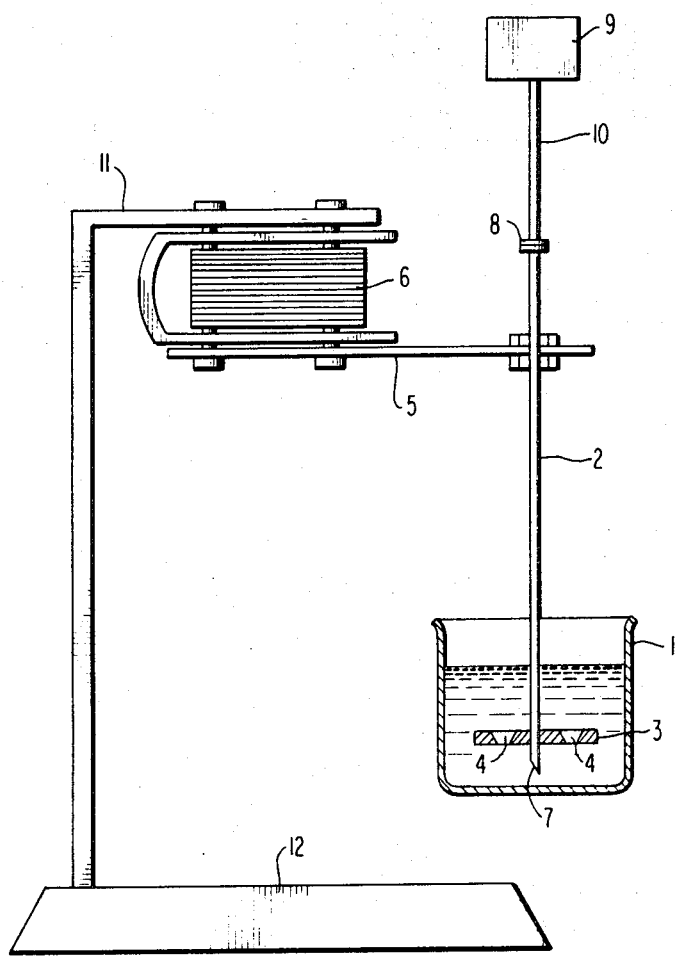

ATOMIC ABSORPTION SPECTROSCOPIC ANALYTICAL METHOD AND APPARATUS

BACKGROUND OF THE INVENTION

1. Field of the Invention

The present invention relates to a method for atomic absorption spectroscopic analysis and an apparatus for carrying out this method, and particularly, in this invention, a sample fed to a flame via an atomizer in an atomic absorption spectroscopic analytical apparatus is analyzed in a uniformly dispersed and mixed state with a liquid.

2. Description of the Prior Art

In prior art methods of atomic absorption spectroscopic analysis, a sample had to be completely soluble in solvents in order to carry out a precise measurement. In case where a sample is hardly soluble in solvents, therefore, prior to an analysis, a pretreatment of the sample is required, which takes a long period of time, often several days. That is to say, it is believed that the measurement is impossible in the case where a sample to be analyzed is a solid, such as a powder, unless the solid is first subjected to an ashing treatment, then decomposed with sulfuric acid, hydrochloric acid or aqua regia, dissolved in a solvent in a completely soluble state and fed to a burner via an atomizer of an atomic absorption spectroscopic analytical apparatus. Such a complicated pretreatment causes errors in measurement.

This invention provides a method, and an apparatus for performing the method, whereby even a powder or a sludge-like sample that could not be analyzed without the complicated pretreatment of the prior art is subjected to an atomic absorption spectroscopic analysis by a simple pretreatment. This invention represents a significant advance in the atomic absorption spectroscopic analysis art whereby the complicated pretreatment of the prior art can be omitted, and not only solid samples of sludge-like samples, but also hardly soluble paste-like samples in known solvents, for example, grease, can be subjected to atomic absorption spectroscopic analysis with a minimized measurement error without the complicated pretreatment step of the prior art. The time for the measurement can be remarkably shortened more than that of the prior art.

It is the principal object of this invention to establish a method and apparatus for atomic absorption spectroscopic analysis which is applicable to a solid or a sludge-like sample that cannot be analyzed without the complicated pretreatment of the prior art. In other words, the present invention provides a method of analysis for a sample by utilizing only a simple pretreatment.

SUMMARY OF THE INVENTION

This invention provides a method for atomic absorption spectroscopic analysis of a solid sample which is uniformly dispersed and mixed with a liquid, the solid having a size of less than 50 mesh by analyzing metal elements contained in the solid sample or the sludge-like sample.

The present invention also provides an apparatus for practising the method of this invention, comprising a sample vessel and a stirring means for dispersing and uniformly mixing the solid and liquid, and a capillary whose lower end thereof is inserted in the vessel and the upper end of which is connected with an atomizer.

BRIEF DESCRIPTION OF THE DRAWING

The FIGURE shows an apparatus suitable for use in the method of the present invention.

DESCRIPTION OF THE PREFERRED EMBODIMENTS

The solid samples applicable to this invention are those in a powdered, granular, massive or colloidal state, or in a mixed state. In the case of a sludge-like sample, it may be used as is or diluted with a known solvent for the sample. In the case of a solid sample having a size of less than 50 mesh, the sample may be mixed with any known solvent for the sample and uniformly dispersed therein. Moreover, a hardly soluble paste-like sample in known solvents, for example, grease, may be uniformly dispersed in any known solvent.

Firstly, the sample and the liquid are mixed and charged into a sample dish 1. When the sample is a solid, in particular, it is added to the medium after being reduced to a size of less than 50 mesh. Then, the lower end of a capillary 2 is immersed in the mixture of the sample and the liquid. The mixture in the sample dish 1 is stirred by a stirring blade 3 fitted to the lower end of the capillary 2. The stirring blade 3 is in the shape of a disc having a certain thickness and several tapered apertures 4. A convection flow of the mixture of the sample and the liquid through the apertures is caused when the stirring blade is shaken vertically. The stirring blade receives a vibration caused by a vibrating means 6, and thus shakes the mixture of the sample and the medium vertically and stirs the same. The mixture becomes uniformly dispersed by the stirring and enters the lower end 7 of the capillary 2, rises inside the capillary 2 while it is being shaken by the vibration caused by the vibrating means 6 (through capillary supporting rod 5) and exits from the upper end 8 of capillary 2. The lower end 7 of the capillary 2 is cut at an angle so that the introduction of the mixture of the sample and the liquid may not be hindered even when end 7 contacts the bottom of the sample dish 1. The rising force of the uniformly dispersed mixture of the sample and the liquid in the capillary tube is provided by the capillarity itself and by the pressure drop caused by a combustion gas flow introduced into an atomizer 9 connected to the upper end of the capillary. It is desirable to shake the uniformly dispersed mixture while it is rising inside the capillary to prevent the sample from settling, but this is not always required when the solid sample is extremely finely divided and uniformly dispersed in the liquid. The uniformly dispersed mixture exiting from the upper end 8 of the capillary 2 is introduced into a tube 10, connecting the upper end 8 of the capillary 2 and an atomizer 9 and is then fed to a burner with the combustion gas via the atomizer 9 in an atomized state. The vibrating means 6 is fitted to a supporting rod 11 fixed to a supporting base 12.

In the case of utilizing vibration, the vibrating means and a stirring blade may be used, while in other cases, a rotatory stirrer or a magnetic stirrer may be used. It is most desirable to vertically shake the mixture of the sample and the liquid. When a vertically shaken stirring blade is employed, it is preferable that it be fitted to the lower end of the capillary.

In accordance with the method of this invention, the sample is added to the liquid without the pretreatments of the prior art and stirred to give a uniformly dispersed mixture of the sample and the liquid. When the sample is solid or powdered, the size is to be less than 50 mesh, preferably less than 300 mesh. The uniformly dispersed mixture of the sample and the liquid is then fed, via an atomizer, to a burner of an atomic absorption spectroscopic analytical apparatus. When the sample is sludge-like, no fine division is required. It can be subjected to analysis as is or after being diluted with the liquid to give a uniform dispersion.

As the liquid for dispersing the sample, an organic solvent is generally preferred. In particular, a solvent which increases the extinction degree according to the element to be analyzed and which raises the sensitivity of the sample is preferably selected. When analyzing elements such as nickel, copper and cadmium, for example, alcohols, especially branched alcohols such as isopropyl alcohol are preferably used. Acetone, n-heptane, methyl isobutyl ketone, methyl ethyl ketone, toluene or xylene or their mixtures are also effective.

The samples preferably used in this invention are solids such as catalysts and soils and sludge-like substances such as heavy oils obtained from the petroleum industry. Hardly soluble paste-like samples in known solvents, for example, grease, are also preferably used.

The apparatus of this invention is an atomic absorption spectroscopic analytical apparatus for carrying out the method of this invention. That is to say, the apparatus comprises a sample vessel and a stirring means for dispersing and mixing the solid and the liquid uniformly and comprises a capillary whose lower end is inserted in the vessel and whose upper end is connected with an atomizer.

As the vibrating means, for example, a magnetic vibrator is preferably used. In cases than vibration, a rotatory stirrer or a magnetic stirrer may preferably be used. The rotatory stirrer employed comprises a rotating means and a stirring blade, but most preferably, a vertically shaken stirrer is employed.

It is very important that the parts immersed in the mixed solution of the sample and the liquid such as the capillary and the stirring blade, are not corroded by the mixed solution. It is desirable that the mixed solution be shaken even during its rise inside the capillary when a stirring blade is fitted to the lower end of the capillary and the vibrating means is connected to the upper end of the capillary. However, in many cases, this type of connection is not always necessary, since the mixed solution is in a finely divided, uniform and perfectly dispersed state. In such case, the stirring blade can be directly connected to the vibrating means and not through the capillary.

The following examples further illustrate the procedure for the atomic absorption spectroscopic analysis according to the present invention using the apparatus of this invention, while the comparative examples illustrate the atomic absorption spectroscopic analysis methods of the prior art.

EXAMPLE 1

A pelletized catalyst containing nickel and cobalt, as a sample, was pulverized in an agate mortar and sieved to obtain fine grains of a size less than 300 mesh. The thus-pulverized sample, to which methanol was added, was charged into a vessel such as 1 and stirred by the action of a magnetic vibrator to obtain a uniformly dispersed mixture. The uniformly dispersed mixture rises inside capillary 2, out the upper end 8, flows through tube 10 and enters atomizer 9. The uniformly dispersed mixture was atomized in the atomizer with a combustion gas and fed to a burner.

The following procedures are similar to those of the existing atomic absorption spectroscopic analyses methods. That is to say, the metallic elements contained in the sample, nickel and cobalt, are dissociated by strong heat in a flame to the atomic state. The light quantum absorption of the thus-obtained atoms under the most stable ground state is measured.

Measurement of the degree of extinction was carried out based on the energy of light of the wavelengths of the nickel and cobalt elements absorbed in the flame into which the uniformly dispersed mixture was sprayed. Then, a concentration corresponding to the measured degree of extinction was read by the standard lines previously prepared. Consequently, the concentration of nickel was determined to be 3.4 percent with a precision of 4.5 percent relative error, and that of cobalt was 2.5 percent with a precision of 4.0 percent relative error. The time for the measurement was about 15 minutes throughout the whole procedure.

COMPARATIVE EXAMPLE 1

The same sample as that of example 1 was charged in a crucible, weighed, burned and introduced into an electric furnace for 3 hours for complete ashing, then decomposed with acid and diluted with water. The thus-treated sample was introduced into an atomizer and treated as in Example 1. Consequently, the concentration of nickel was determined to be 3.4 percent with a precision of 5.0 percent relative error and that of cobalt was 2.5 percent with a precision of 4.3 percent relative error. The time for measurement including the pretreatment was about 3.5 hours.

EXAMPLE 2

A heavy oil as a sample was diluted with toluene and charged into vessel 1. The same procedures were followed as in Example 1. The metals contained in the sample, their concentrations and results are shown in the table below.

COMPARATIVE EXAMPLE 2

The same example as that of sample 2 was subjected to an ashing treatment, decomposed with aqua regia, diluted with water and then introduced into an atomizer. The same procedures were followed as in Example 1. The results are given in the table below.

EXAMPLE 3

Grease, as a sample, was diluted with methyl ethyl ketone and charged into vessel 1. The procedures which followed were similar to those of sample 1. The metals contained in the sample, their concentrations and the results are shown in the table below.

COMPARATIVE EXAMPLE 3

The same example is that of sample 3 was extracted with hydrochloric acid and introduced into an atomizer. The procedure which followed was similar to that of sample 1. The results are shown in the table below.

The following table shows the results of sample 1 to 3 and Comparative Examples 1 to 3. As is evident from these results, the error is remarkably reduced according to this invention as compared with the prior art.

| Sample | | Metal and Conc. in sample | Treatment | Precision (relative error %) | |
|---|---|---|---|---|---|
| Example 1 | grain catalyst | Ni (3.4%) Co (2.5%) | finely divided to 300 mesh and dispersed in methanol | Ni 4.5 Co 4.0 | |
| Comparative Example 1 | grain catalyst | Ni (3.4%) Co (2.5%) | subjected to ashing, decomposed with acid and diluted with water | Ni 5.0 Co 4.3 | |
| Example 2 | heavy oil | V (20 ppm) Na (20 ppm) | diluted with toluene | V 1.5 Na 1.0 | |
| Comparative Example 2 | heavy oil | V (20 ppm) Na (20 ppm) | subjected to ashing, decomposed with aqua regia and diluted with water | V 1.7 Na 1.4 | |
| Example 3 | grease | Li (2.3 %) | uniformly dispersed in methyl isobutyl ketone | Li 1.8 | |
| Comparative Example 3 | grease | Li (2.3%) | extracted with hydrochloric acid | Li 2.0 | |

What is claimed is:

1. A method of atomic absorption spectroscopic analysis of a solid material or a solids-containing material comprising the steps of
   1. uniformly dispersing said solid material or said solids-containing material in a liquid medium to form a uniform dispersion of solid particles in said liquid medium, the particle size of said solid material or of the solids in said solids-containing material being less than 50 mesh,
   2. capillarily withdrawing a sample of said uniform dispersion of said solid particles in said liquid medium while simultaneously agitating said uniform dispersion and vibrating said capillarily withdrawn sample to ensure continued uniformity,
   3. atomizing said capillarily withdrawn sample of said uniform dispersion of said solid particles in said liquid medium, and
   4. spectroscopicly analyzing the atomic absorption of said atomized sample.

2. An apparatus for atomic absorption spectroscopic analysis which comprises
   1. a sample vessel for containing a sample of a liquid dispersion,
   2. agitating means for dispersing and uniformly mixing a solid and a liquid in said liquid dispersion,
   3. a capillary whose lower end is immersed in said liquid dispersion, whose upper end is connected with an atomizer, and through which said liquid dispersion can pass,
   4. vibrating means for vertically shaking said agitating means and said capillary, and
   5. means connected with said atomizer for spectroscopicly analyzing the atomic absorption of said liquid dispersion.

3. The apparatus of claim 2 wherein said vibrating means is a magnetic vibrator.

4. The apparatus of claim 2, wherein said vibrating means is connected to the upper end of said capillary and wherein further a blade having a plurality of apertures is connected to the lower end of said capillary, the plane of said blade being transversely oriented to the axis of said capillary.

5. The apparatus of claim 4, wherein each of said apertures are frustro-conical.

6. The apparatus of claim 5 wherein the plane of said blade is substantially perpendicular to the axis of said capillary.

* * * * *